United States Patent [19]
Amano et al.

[11] 3,992,577
[45] Nov. 16, 1976

[54] VIDEO DISPLAY SYSTEM

[75] Inventors: Yoshifumi Amano, Zushi; Toshio Shionoya, Tokyo, both of Japan

[73] Assignee: Sony Corporation, Tokyo, Japan

[22] Filed: June 24, 1975

[21] Appl. No.: 589,901

[30] Foreign Application Priority Data
June 28, 1974 Japan .............................. 49-74008

[52] U.S. Cl. ..................... 178/7.3 D; 315/169 TV; 340/324 M
[51] Int. Cl.² ...................... H04N 3/10; H04N 5/66
[58] Field of Search .......... 178/7.3 D; 315/169 TV; 340/324 M

[56] References Cited
UNITED STATES PATENTS
3,838,209   9/1974   Tsuchiya et al ................ 178/7.3 D

*Primary Examiner*—Robert L. Richardson
*Attorney, Agent, or Firm*—Lewis H. Eslinger; Alvin Sinderbrand

[57] ABSTRACT

A video display system employing a flat display panel of X-Y matrix type, signal sampling means, "write in" and "read out" memory circuits serially connected between the signal sampling means and the display panel, and a novel signal control means connected to the "write in" and "read out" memory circuits wherein the number of lines or leads for distributing signals from the "read out" memory circuits to the display panel and the number of memory devices used in the "read out" memory circuits are reduced substantially.

8 Claims, 38 Drawing Figures

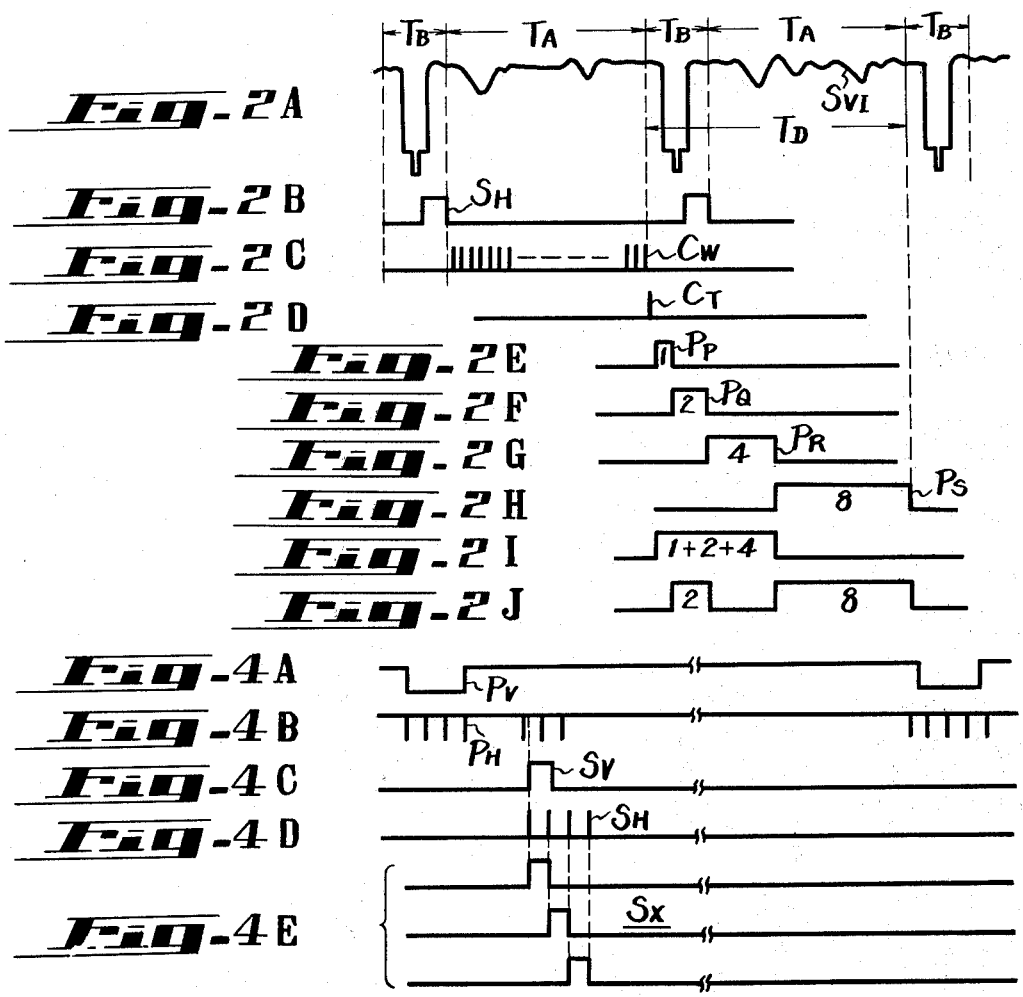

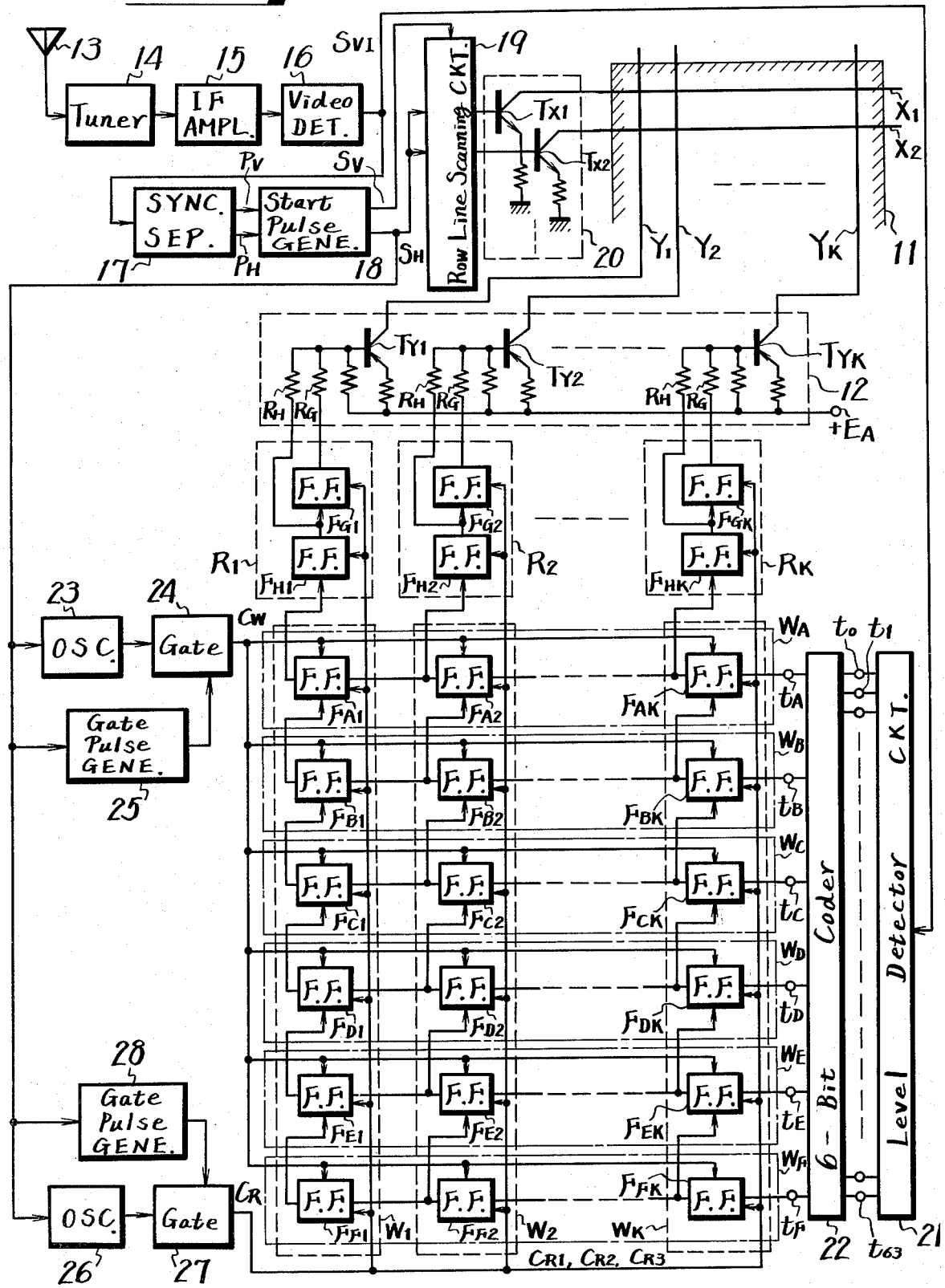

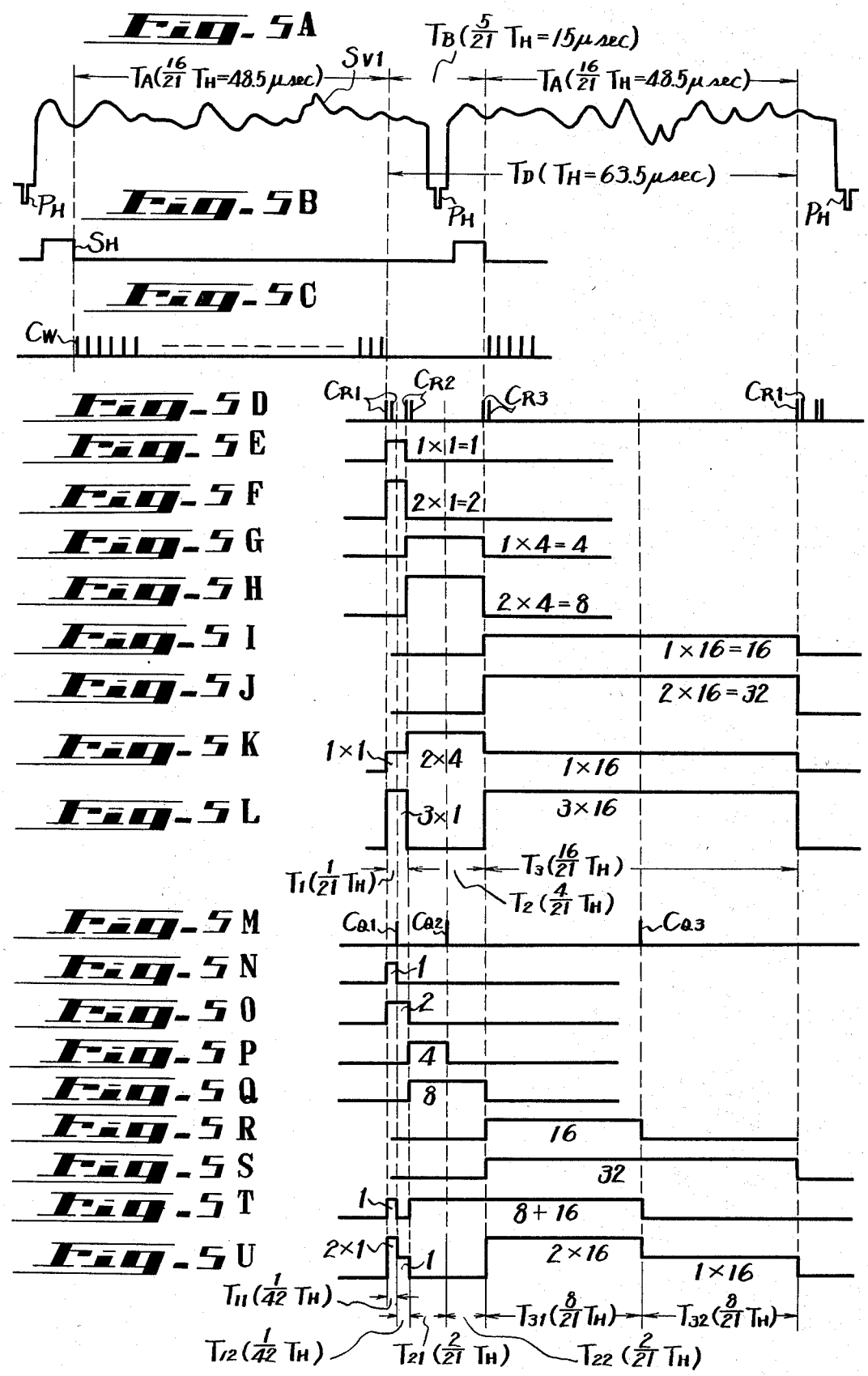

VIDEO DISPLAY SYSTEM

BACKGROUND OF THE INVENTION

1. Field of the Invention

This invention relates generally to a video display system and more particularly to such a system which includes a flat panel of X-Y matrix type and an improved signal storing and read-out means for making the whole system simple in construction and small in size.

2. Description of the Prior Art

Recently, video display systems utilizing a flat panel of X-Y matrix type have become the object of considerable interest for television signal reproducing apparatus.

In such systems, different kinds of flat panels, such as gas discharge panels, liquid crystal panels, electroluminescent panels and the like have been used, and extensive research has been conducted in respect to the flat panels and their driving circuits.

However, the video display systems of the prior art are usually complicated especially in their driving circuits.

One reason for this complexity is the very large number of signal distribution lines or leads for driving the flat panel and another reason is the correspondingly large number of memory devices used therein.

In more detail, supposing that an X-Y matrix of display panel is formed by 300 column lines and 300 row lines and a video input signal is sampled and each sample converted to a 4-bit digitally coded signal, the system is usually provided with $300 \times 4 = 1200$ memory devices for storing or writing the digitially coded signal and another 1200 memory devices for reading out the digitally coded signal, so that the total number of the memory devices is of $1200 \times 2 = 2400$, and further the number of the signal distribution lines or leads from the memory devices to the display panel also is $1200 \times 2 = 2400$.

OBJECTS AND SUMMARY OF THE INVENTION

Accordingly, it is an object of this invention to provide an improved video display system of the type referred to above, and in which the inherent disadvantages in the prior art are avoided.

It is another object of the invention to provide an improved video display system having a flat panel of X-Y matrix type in which signal memory circuits are simplified.

It is a further object of the invention to provide an improved video display system having a flat panel of X-Y matrix type in which a signal distribution system in the memory circuits is simplified and made efficient.

The video display system of this invention includes a flat display panel of X-Y matrix type, signal sampling means, "write in" and "read out" memory circuits serially connected between the signal sampling means and the display panel, and a novel signal control means connected to the "write in" and "read out" memory circuits.

In accordance with an aspect of the invention, each of the "read out" memory circuits is formed as an m-bit (m being a positive integer) shift register having an input terminal for receiving signals from the corresponding one of the "write in" memory circuits and m output terminals for reading out signals in parallel therefrom whereby the signal distribution from the "read out" memory circuits to the display panel is simplified and made efficient.

According to another aspect of this invention, the number of "read out" memory circuits is reduced to be a fraction of the number of "write in" memory circuits by introducing a novel control means for transmitting signals from the "write in" memory circuits to the "read out" memory circuits fragmentarily during a horizontal scanning period.

This invention will best be understood from the following detailed description read in connection with the accompanying drawings.

BRIEF DESCRIPTION OF THE DRAWINGS

FIGS. 2A–2J, inclusive, are waveform diagrams which are useful in explaining the operation of the video display system shown in FIG. 1.

FIG. 3 is a block diagram of a video display system according to one embodiment of the present invention, and FIGS. 4A–4E and 5A–5U, inclusive, are waveform diagrams which are useful in explaining the operation of the video display system of the embodiment shown in FIG. 3.

DESCRIPTION OF THE PREFERRED EMBODIMENT

Figure 1:
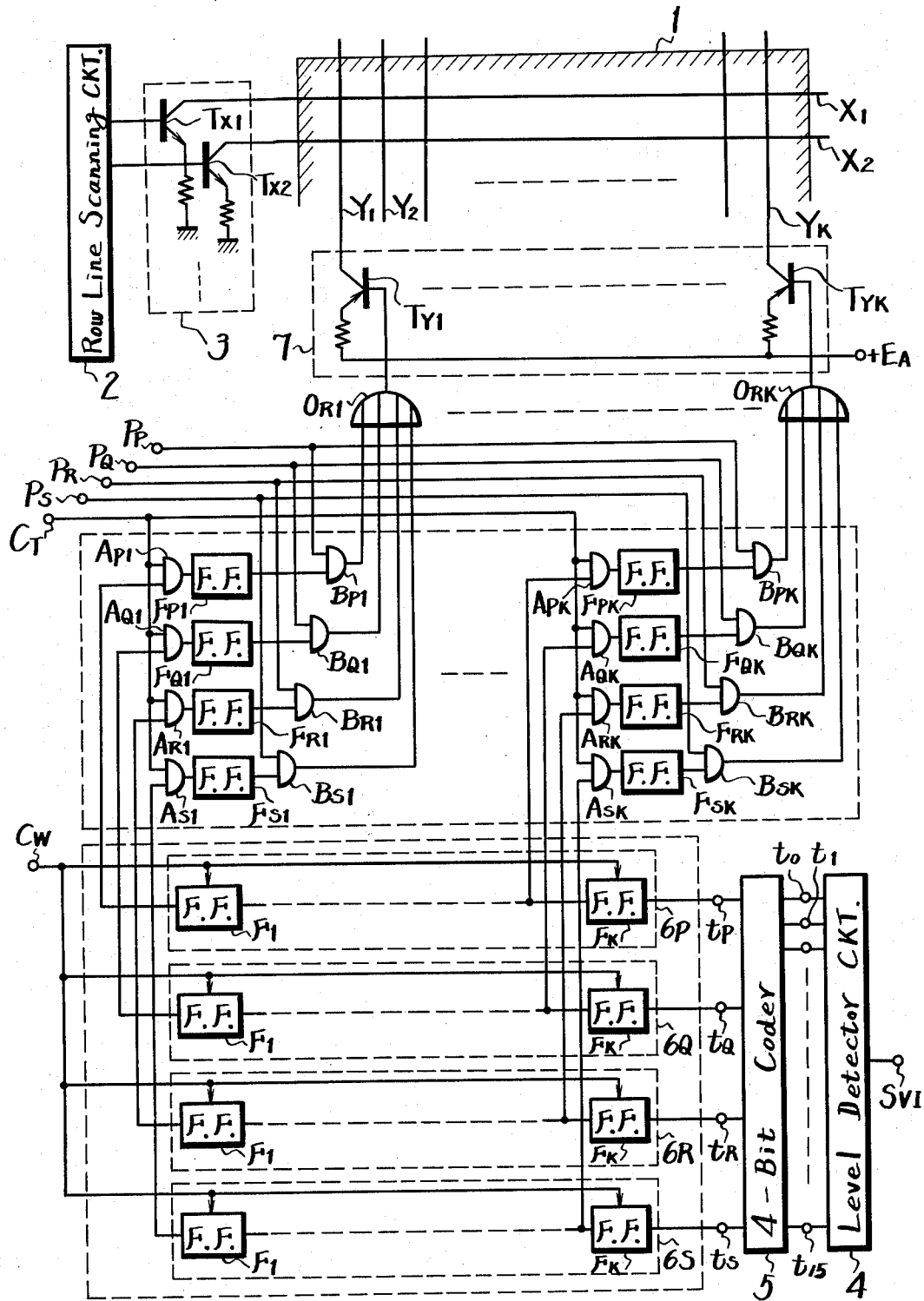
FIG. 1 is a block diagram of a video display system according to the prior art.

In order to better understand the present invention, the prior art video display system will be described with reference to FIGS. 1 and 2A to 2J.

In FIG. 1, reference numeral 1 designates a video display panel or flat panel such as, for example, of a discharge tube of X-Y matrix type which has a plurality of parallel row lines $X_1, X_2, \ldots$ and a plurality of parallel column lines $Y_1, Y_2, \ldots Y_K$ perpendicular to the former (K being a positive integer). In this case, by way of example, the row lines $X_1, X_2, \ldots$ serve as cathode electrodes, while the column lines $Y_1, Y_2, \ldots Y_K$ serve as anode electrodes, respectively. The vertical and horizontal start pulse signals obtained from the vertical and horizontal synchronizing signals are supplied to a row line scanning circuit 2 which then produces at its plural output terminals driving pulses which are shifted or delayed by one horizontal scanning period, respectively. The driving pulses are then supplied to a row line driving circuit 3 whose driving transistors $T_{X1}, T_{X2}, \ldots$ are made conductive sequentially in a delayed or shifted manner by one horizontal scanning period, respectively. While, a video signal $S_{VI}$, such as shown in FIG. 2A, from a video detector circuit (not shown) is supplied to a level detector circuit 4 which divides the level of the video signal $S_{VI}$ by, for example, 16 steps and delivers at its output terminals $t_0, t_1, \ldots t_{15}$ output signals in accordance with the divided, or thus sampled, levels. The output signals from the level detector circuit 4 are supplied to a 4-bit coder 5 which produces 4-bit binary coded signals at its output terminals $t_P, t_Q, t_R$ and $t_S$, respectively, the 4-bit binary signal being a digitally-coded representation of the sampled level of video signal $S_{VI}$. The respective bit signals obtained at the terminals $t_P, t_Q, t_R$ and $t_S$ are applied to "write in" memory circuits $6_P, 6_Q, 6_R$ and $6_S$ each of which comprises flip-flop circuits $F_1, \ldots F_K$ provided in number in correspondence with the column lines $Y_1, \ldots Y_K$, which flip-flop circuits $F_1 F_K$ operate as shift registers, respectively. The shift registers forming the respective "write in" memory circuits $6_P$ to $6_S$ are controlled with a clock pulse $C_W$ such as shown in FIG. 2C, respectively. Thus, the video signal $S_{VI}$ shown in FIG. 2A is sampled in such a manner that, during an effective picture period $T_A$ in the horizontal scanning period, the video signal $S_{VI}$ is sequentially sampled at every clock pulse $C_W$ following the occurrence of a horizontal start pulse $S_H$ (FIG. 2B). As the sampling operation is performed, 4-bit coder 5, and output terminals $t_P$ to $t_S$ of the 4-bit coder 5, and the thus sampled signals are sequentially shifted from coder 5 into the respective "write in" memory circuits $6_P$ to $6_S$ from the right to the left laterally in synchronism with the clock pulses $C_W$ and sequentially written or stored therein. When the sampled signals have been written or stored in all the flip-flop circuits $F_1$ to $F_K$ of the respective "write in" memory circuits $6_P$ to $6_S$, the stored signals in the flip-flop circuits $F_1$ to $F_K$ are shifted or transmitted with a memory shift pulse $C_T$ (shown in FIG. 2D) through AND-circuits $A_{P1}$ to $A_{PK}$, $A_{Q1}$ to $A_{QK}$, $A_{R1}$ to $A_{RK}$ and $A_{S1}$ to $A_{SK}$ to flip-flop circuits $F_{P1}$ to $F_{PK}$, $F_{Q1}$ to $F_{QK}$, $F_{R1}$ to $F_{RK}$ and $F_{S1}$ to $F_{SK}$ which form "read out" memory circuits in parallel with one another, simultaneously and at the same time. As shown in FIGS. 2A to 2J, during the next horizontal period or a composite period of non-effective picture period $T_B$ and the effective picture period $T_A$ i.e. during the next display interval $T_D$, the signals stored in the flip-flop circuits $F_{P1}$ to $F_{PK}$, $F_{Q1}$ to $F_{QK}$, $F_{R1}$ to $F_{RK}$ and $F_{S1}$ to $F_{SK}$ as the "read out" memory circuits are read out with pulse signals $P_P$, $P_Q$, $P_R$ and $P_S$ (shown in FIGS. 2E, 2F, 2G and 2H), whose pulse widths increase in order as the binary representations 1, 2, 4 and 8 sequentially, the stored signals being read out sequentially through AND-circuts $B_{P1}$ to $B_{PK}$, $B_{Q1}$ to $B_{QK}$, $B_{R1}$ to $B_{RK}$ and $B_{S1}$ to $B_{SK}$, respectively. The thus read-out signals from the flip-flop circuits $F_P$ to $F_S$ are derived, at every group corresponding to each of the column lines $Y_1$ to $Y_K$, supplied through OR-circuits $O_{R1}$ to $O_{RK}$, and then supplied to driving transistors $T_{Y1}$ to $T_{YK}$ of a column line driving circuit 7, respectively.

Accordingly, in such a case that the level of the video signal $S_{VI}$ at a certain sampling time in a certain effective picture period $T_A$ of a horizontal scanning period is at, for example, the 7th step in the 16 steps of 0, 1, 2, ... 15, this video signal $S_{VI}$ is coded as ⌈0111⌋ by the 4-bit coder 5. During the next display period $T_D$, the corresponding column line is driven with the coded pulse signal represented by a line-driving signal whose pulse width is 1 + 2 + 4 = 7 shown in FIG. 2I, and a discharging current flows between the corresponding column and row lines to make the brightness at the crossing point therebetween be equal to a brightness level corresponding to the 7th step. When the level of the video signal $S_{VI}$ is at the 10th step, for example, it is coded by the 4-bit coder 5 as ⌈1010⌋. Then, the corresponding column line is driven during the display period $T_D$ with the line-driving pulse signal whose pulse width is 2 + 8 = 10 shown in FIG. 2J and the brightness at the crossing point between the column line and the corresponding row line becomes equal to a brightness level corresponding to the 10th step. Similarly, the time interval of discharge current flowing between the remaining column and row lines is varied and hence the brightness at the crossing points therebetween is modulated or controlled to display a picture on the display panel 1.

With the prior art display system constructed as above, the "read ou" memory circuit corresponding to one column line requires memory devices whose number is same as the number of bits included in the coded representation of the video signal, and accordingly it becomes complicated in construction and, thus, expensive. Further, the number of leads or conductors for reading out the signals from the "read out" memory circuits likewise is relatively high. By way of example, if the video signal is encoded with 4 bits as shown in FIG. 1 and there are 300(K = 300), 4 × 300 = 1200 leads are required for reading out the signals. Similarly, the same number of leads are also necessary for deriving the read-out signals of the respective bits in each group at every column line. Thus, the wiring becomes greatly complicated.

An embodiment of the video display system according to the present invention which is free from the defects of the above mentioned prior art system will be described with reference to FIGS. 3, 4A to 4E and 5A to 5U.

In FIG. 3, reference numeral 11 designates a display panel which may be of a discharge tube type such as shown in FIG. 1. This display panel 11 comprises a plurality of parallel row lines $X_1, X_2, \ldots$ and a plurality of parallel column lines $Y_1, Y_2, \ldots Y_K$ (K being a positive integer) which are perpendicular to the row lines $x_1, X_2, \ldots$ In this case, the row lines $X_1, X_2, \ldots$ serve as cathode electrodes and the column lines $Y_1, Y_2, \ldots Y_K$ serve as anode electrodes, respectively.

In this invention, "write in" memory circuits $W_1, W_2, \ldots W_K$ each of which consists of, for example, 6 bits are provided for the column lines $Y_1, Y_2, \ldots Y_K$, respectively. The "write in" memory circuits $W_1, W_2, \ldots W_K$ include 6 flip-flop circuits $F_{A1}$ to $F_{F1}$, $F_{A2}$ to $F_{F2} \ldots F_{AK}$ to $F_{FK}$ are connected in such a manner that they form shift registers in the respective memory circuits $W_1, W_2 \ldots W_K$ in the longitudinal direction. These flip-flop circuits are further connected such that those corresponding to the respective column lines $Y_1, Y_2, \ldots Y_K$ at every bit are connected to form lateral shift registers, respectively following the occurrence of a horizontal start pulse $S_H$ (FIG. 2B). As the to form "write in" memory circuits $W_A, W_B, W_C, W_D, W_E$ and $W_F$ at the respective bit location. For the respective column lines $Y_1, Y_2, \ldots Y_K$, there are further provided "read out" memory circuits $R_1, R_2, \ldots R_K$ of, for example, 2 bits. The "read out" memory circuits $R_1, R_2, \ldots R_K$ include 2 flip-flop circuits $F_{G1}$ to $F_{H1}$, $F_{G2}$ to $F_{H2}, \ldots F_{GK}$ to $F_{HK}$ each pair of flip-flop circuits being connected to form longitudinal shift registers, respectively. The output terminals of the flip-flop circuits $F_{A1}$ to $F_{AK}$, which correspond to the lowest or least significant bits of the "write in" memory circuits $W_1$ to $W_K$, are connected to the input terminals of the flip-flop circuits $F_{H1}$ to $F_{HK}$ of the "read out" transmit the signals from the "write in" memory circuits $W_1$ to $W_K$ to the "read out" memory circuits $R_1$ to $R_K$, respectively. The base electrodes of driving transistors $T_{Y1}, T_{Y2}, \ldots T_{YK}$ in a column line driving circuit 12 are connected through resistors $R_G$ and $R_H$ to the flip-flop circuits $F_{G1}, F_{H1}; F_{G2}, F_{H2}; \ldots F_{GK}, F_{HK}$, respectively. In the illustrated example, the resistors $R_G$ and $R_H$ are selected to be of different resistance vaue. When both groups of the flip-flop circuits $F_{G1}$ to $F_{GK}$ and $F_{H1}$ to $F_{HK}$ in the "read out" circuits $R_1 R_K$ are in the state of ⌈0⌋, the transistors $T_{Y1}$ to $T_{YK}$ become nonconductive, while when the flip-flop circuit group $F_{G1}$- to $F_{GK}$ is in the state of ⌈1⌋ but the other group $F_{H1}$ to $F_{HK}$ is in the state of ⌈0⌋, a current having the amplitude corresponding to the level 1 flows in the transistors $T_{Y1}$ to $T_{YK}$, respectively. On the contrary, when the circuit group $F_{G1}$ to $F_{GK}$ is ⌈0⌋ but the other group $F_{H1}$ to $F_{HK}$ is ⌈1⌋, a current having the amplitude corresponding to the level 2 flows in the transistors $T_{Y1}$ to $T_{YK}$. When both the groups $F_{G1}$ to $F_{GK}$ and $F_{H1}$ to $F_{HK}$ are ⌈1⌋, a current having the amplitude corresponding to the level 3 flows in the transistors $T_{Y1}$ to $T_{YK}$. This current selection is performed by suitably selecting the resistance values of the resistors $R_G$ and $R_H$.

A television signal received by antenna 13 is supplied through a tuner 14 and an IF amplifier circuit 15 to a video detector circuit 16. The video signal $S_{V1}$ obtained from the video detector circuit 16 is applied to a sync. separator circuit 17 which then produces vertical and horizontal synchronizing signals $P_V$ and $P_H$ as shown in FIGS. 4A and 4B, respectively. The signals $P_V$ and $P_H$ are applied to a start pulse generator 18 which then produces vertical and horizontal start pulses $S_V$ and $S_H$ such as shown in FIGS. 4C and 4D, respectively. The start pulses $S_V$ and $S_H$ are supplied to a row line scanning circuit 19 formed of shift registers which produces at its plural output terminals pulses $S_X$ which are shifted or delayed by one horizontal scanning period as shown in FIG. 4E. The pulses $S_X$ are applied to a row line driving circuit 20 to make its driving transistors $T_{X1}$, $T_{X2}$, . . . conductive sequentially in delayed manner by one horizontal scanning period and thereby to make the row lines or cathode electrodes $X_1$, $X_2$, . . . nearly ground potential sequentially at every one horizontal scanning period.

The video signals $S_{V1}$ (refer to FIG. 5A) from the video detector circuit 16 is supplied to a level detector circuit 21 which detects, or samples the video signal $S_{V1}$ with its level divided into, for example, 64 steps and delivers the divided, or sampled outputs to its output terminals $t_0$, $t_1$, . . . $t_{63}$ in response to the divided levels. The output signals at the terminals $t_0$, $t_1$, . . . $t_{63}$ are supplied to and encoded by a 6-bit coder 22. That is, flip-flop circuits $F_{A1}$, $F_{A2}$, . . . $F_{AK}$ are connected to form a lateral shift register, flip-flop circuits $F_{B1}$, $F_{B2}$, . . . $F_{BK}$ are connected to form a lateral shift register, and so on, 6-bit binary coded signals at output terminals $t_A$, $t_B$, . . . $t_F$ of the 6-bit coder. The 6-bit binary coded signals are supplied to the "write in" memory circuits $W_A$, $W_B$, . . . $W_F$ connected to receive the respective bits. The horizontal start pulse $S_H$ (shown in FIG. 5B) produced by the start pulse generator 18 is further supplied to an oscillator circuit 23 to drive the same in synchronism therewith. The output signal produced by the oscillator circuit 23 is supplied to a gate circuit 24. The horizontal start pulse $S_H$ is also supplied to a gate pulse generator circuit 25 whose output gate pulse in supplied to the gate circuit 24 to control the same. Thus, the gate circuit 24 produces a train of clock pulses $C_W$ during the effective picture period $T_A$ of the horizontal scanning period as shown in FIG. 5C. The clock pulse $C_W$ is supplied to the flip-flop circuits $F_{A1}$ to $F_{AK}$, . . . $F_{F1}$ to $F_{FK}$ of the "write in" memory circuits $W_A$ to $W_F$, respectively, to sample the respective bit levels supplied to the respective "write in" memory circuits $W_A$ to $W_F$ by coder 22 and to laterally shift the sampled values through the circuits $W_A$ to $W_F$ from the right to the left sequentially. Thus, the sampled values are written in the "write in" memory circuits $W_1$ to $W_K$ corresponding to the column lines $Y_1$ to $Y_K$, respectively. In this case, the effective picture period $T_A$ of the horizontal scanning period is selected to be about 16/21 of the horizontal scanning period $T_H$ (16/21$T_H$.)

Another oscillator circuit 26 is also driven by the horizontal start pulse $S_H$ in synchronism therewith and its output is supplied to a gate circuit 27. The horizontal start pulse $S_H$ is also supplied to a gate pulse generator circuit 28 whose output pulse or gate pulse is supplied to the gate circuit 27 to control the same. Thus, the gate circuit 27 produces pulses CR at the time when the "write in" operations to all the "write in" memory circuits $W_1$ to $W_K$ are completed, that is, immediately after the effective picture period $T_A$. The pusles CR comprise a pair of closely occurring pulses $C_{R1}$, a pair of closely occurring pulses $C_{R2}$ which delayed from the pulses $C_{R1}$ by 1/21$T_H$, and a pair of closely occurring pulses $C_{R3}$ which are delayed from the pulses $C_{R2}$ by 4/21$T_H$ sequentially. The pulses $C_{R1}$, $C_{R2}$ and $C_{R3}$ are supplied to all the flip-flop circuits in the "write in" memory circuits $W_1$ to $W_K$ and "read out" memory circuits $R_1$ to $R_K$ as longitudinal or "read out" shift pulses, respectively. Thus, immediately after the end of the effective picture period $T_A$, the signals stored in the flip-flop circuits $F_{A1}$ to $F_{AK}$ and $F_{B1}$ and $F_{BK}$ are transmitted by the pair of pulses $C_{R1}$ to the flip-flop circuits $F_{G1}$ to $F_{GK}$ and $F_{H1}$ to $F_{HK}$, respectively. Thereafter, the signals stored initially in the flip-flop circuits $F_{C1}$ to $F_{CK}$ and $F_{D1}$ to $F_{DK}$ are transmitted by the pair of pulses $C_{R2}$ to the flip-flop circuits $F_{G1}$ to $F_{GK}$ and $F_{H1}$ to $F_{HK}$, respectively, and then the signals stored initially in the flip-flop circuits $F_{E1}$ to $F_{EK}$ and $F_{F1}$ to $F_{FK}$ are transmitted by the pair of pulses $C_{R3}$ to the flip-flop circuits $F_{G1}$ to $F_{GK}$ and $F_{H1}$ to $F_{HK}$, respectively. Since the transistors $T_{Y1}$ to $T_{YK}$ of the column driving circuit 12 are driven by the flip-flop circuits $F_{G1}$ to $F_{GK}$ and $F_{H1}$ to $F_{HK}$ as mentioned previously, the transistors $T_{Y1}$ to $T_{YK}$ are driven sequentially with the signals stored in the flip-flop circuits $F_{A1}$ to $F_{AK}$ and $F_{B1}$ to $F_{BK}$; $F_{C1}$ to $F_{CK}$ and $F_{D1}$ to $F_{DK}$; and $F_{E1}$ to $F_{EK}$ and $F_{F1}$ to $F_{FK}$ in accordance with the pulses $C_{R1}$, $C_{R2}$ and $C_{R3}$, respectively.

As an example when the encoded 6-bit sampled video signal ⌈1⌋ at the first bit, the discharge current having the amplitude corresponding to the level 1 flows during a time period $T_1$ of 1/21$T_H$ (refer to FIG. 5E); That is, flip-flop circuits $F_{A1}$, $F_{A2}$, . . . $F_{AK}$ are connected to form a lateral shift register, flip-flop circuits $F_{B1}$, $F_{B2}$, . . . $F_{BK}$ are connected to form a lateral shift register, and so on, when the second bit of the encoded signal is ⌈1⌋, the discharge current having the amplitude corresponding to the level 2 flows during the same time period $T_1$ (refer to FIG. 5F); and when the third bit of the encoded signal is ⌈1⌋, the discharge current having the amplitude corresponding to the level 1 flows during a time period $T_2$ of 4/21$T_H$ (refer to FIG. 5G) such that the sampled levels of the video signal $S_{VI}$ are represented as. The operation thereafter will be similarly performed, as shown in FIGS. 5H to 5J. That is, during the display period $T_D$ of one horizontal scanning period $T_H$ consisting of the non-effective horizontal picture period $T_B$ and effective horizontal picture period $T_A$ write-in operations are performed, and after all the write-in operations have been completed, the discharge currents flow having the amplitudes and pulse widths corresponding to the respective bits in the encoded 6-bit sample of the video signal.

Accordingly, when the level of the video signal $S_{VI}$ at a sampling time is, for example, at the 25th step of the steps 0, 1, 2, . . . 63 and is coded as ⌈011001⌋, the discharging currents having the amplitudes corresponding to the levels 1, 2 and 1 flow during the time periods $T_1$, $T_2$ and $T_3$, respectively, as shown in FIG. 5K. Thus, the brightness such that the sampled levels of the video signal $S_{VI}$ are represented as the 25th step. When the sampled level of video signal $S_{VI}$ sampled is at, for example, the 51st step and is coded as ⌈110011⌋, the discharging current has amplitude corresponding to the level 3 during the time period $T_1$ due to the fact that both the flip-flop circuits $F_{Gn}$ and $F_{Hn}$ of the "read out" memory circuit $R_n$ become ⌈1⌋, and the time during which the flip-flop circuits $F_{A1}$ to $F_{AK}$ are "read out" the current has an amplitude corresponding to the level 3 during the time period $T_3$ as shown in FIG. 5L. Thus, by integration of the discharging currents the brightness is equal to a brightness level corresponding to the 51st step.

At the time that the lost of the signals stored in the "write in" memory circuits $W_1$ to $W_K$ are transmitted by the read out pulse $C_{R3}$ to the "read out" memory circuits $R_1$ to $R_K$, the next effective horizontal picture period $T_4$ occurs and the video signal $S_{VI}$ in the next horizontal scanning period is sampled in accordance with the above mentioned clock pulse $C_W$ an amplitude corresponding to the level 0 during the time period $T_2$ due to the fact that these flip-flop circuits $F_{Qn}$ and $F_{Hn}$ become ⌈0⌋. Similarly, the "write in" memory circuits $W_1$ to $W_K$, to be stored therein similar to the foregoing operation, the sampled signal s encoded and the encoded representation is "written" into, a picture is displayed on the display panel 11.

The above description is given for the case where the resistance values of the resistors $R_G$ and $R_H$ are selected to be different from each other such that the amplitudes of the discharge currents resulting from a ⌈1⌋ in the flip-flop circuits $F_{H1}$ to $F_{HK}$ become twice when these stored signals are read out on a line-by-line basis the flip-flop circuits $F_{G1}$ to $F_{GK}$. However, in an alternative embodiment, the resistance values of the resistors $R_G$ and $R_H$ are made equal and the amplitudes of the discharging currents resulting from a ⌈1⌋ in the flip-flop circuits $F_{G1}$ to $F_{GK}$ of the "read out" memory circuits $R_1$ to $R_K$ are equal to from a ⌈1⌋ in the flip-flop circuits $F_{H1}$ to $F_{HK}$. In this alternative embodiments, "read out" pulses $C_{Q1}$, $C_{Q2}$ and $C_{Q3}$ are at the mid times between the pulses $C_{R1}$ and $C_{R2}$, between the pulses $C_{R2}$ and $C_{R3}$, and between the pulses $C_{R3}$ and $C_{R1}$, respectively, as shown in FIG. 5M. These "read out" pulses $C_{Q1}$, and $C_{Q2}$ and $C_{Q3}$ are produced in a manner similar to the production of pulses $C_{R1}$ to $C_{R3}$ and are supplied together with pairs of pulses $C_{R1}$, $C_{R2}$ and $C_{R3}$ to the flip-flop circuits $F_{G1}$ to $F_{GK}$ and $F_{H1}$ to $F_{HK}$ of the "read out" memory circuits $R_1$ to $R_K$.

Thus, as shown in FIGS. 5N to 5S, the signal at the first or least significant bit is read out from the flip-flop circuits $F_{G1}$ to $F_{GK}$ during a time period $T_{11}$ having a time duration of $1/42T_H$ in the first half of the time period $T_1$; the signal at the second bit is also read out from the flip-flop circuits $F_{H1}$ to $F_{HK}$ during the time period $T_{11}$ and at the conclusion of time period $T_{11}$ the latter signal is transmitted to the flip-flop circuits $F_{G1}$ to $F_{GK}$ and then read out therefrom during a next period $T_{12}$ also having a time duration of $1/42T_H$. The signals at the third and fourth bits, and those at the fifth and sixth bits are similarly treated, respectively, and the discharging currents having amplitudes determined by the signals at the respective bits flow during time periods corresponding to the relative significance of the respective bits.

As an example, when the level of the sampled video signal $S_{VI}$ is at, for example, the 25th step and is coded as ⌈011001⌋, the current having the amplitude corresponding to the level 1 flows during the time periods $T_{11}$, $T_{21}$, $T_{22}$ and $T_{31}$, as shown in FIG. 5T, and the brightness becomes 25th step as its integrated value. As another example, if the level of the sampled video signal the 51st step and is coded as ⌈110011⌋, the discharging current having the amplitude corresponding to the level 2 flows during the time period $T_{11}$ due to the fact that both of the flip-flop circuits $F_{Gn}$ and $F_{Hn}$ of the "read out" memory circuit $R_n$ exhibit the state of ⌈1⌋.

At the conclusion of period $T_{11}$. "read out" pulse $C_{Q1}$ is applied to flip-flop circuits $F_{Gn}$ and $F_{Hn}$ so that during period $T_{12}$ the discharging current amplitude corresponds to the level 1. At the conclusion of period $T_{12}$, "read out" pulses $C_{R2}$ transfer the signals initially stored in flip-flop circuits $F_{Cn}$ and $F_{Dn}$ into flip-flop circuits $F_{Gn}$ and $F_{Hn}$. Since these signals exhibit the states ⌈0⌋ and ⌈0⌋ respectively, the discharging current amplitude during period $T_{21}$ corresponds to the level 0. At the conclusion of period $T_{21}$, "read out" pulse $C_{Q2}$ transfers the contents of flip-flop circuit $F_{Hn}$ into flip-flop circuit $F_{Gn}$. Thus, during the period $T_{22}$ the discharging current amplitude corresponds to the level 0. At the conclusion of period $T_{22}$, "read out" pulses $C_{R3}$ transfer the signals initially stored in flip-flop circuits $F_{En}$ and $F_{Fn}$ into flip-flop circuits $F_{Gn}$ and $F_{Hn}$. Since these signals exhibit the states ⌈1⌋ and ⌈1⌋, respectively, the discharging current amplitude during period $T_{31}$ corresponds to the level 2. At the conclusion of period $T_{31}$, "read out" pulse $C_{Q3}$ transfers the contents of flip-flop circuit $F_{Hn}$ into flip-flop circuit $F_{Gn}$. Thus, during the period $T_{32}$ the discharging current amplitude corresponds to the level 1. This discharging current is shown in FIG. 5U. Since brightness is determined by integrating the discharging current, the brightness for this sample of the video signal is equal to a level corresponding to the 51st step.

With the video display system according to the present invention described above, even if the video signal is coded to be, for example, 6 bits, a 2-bit "read out" memory circuit is sufficient, so that the construction or the display system becomes much simplified and inexpensive over that shown in, for example, FIG. 1. Further, the signal transmission from the "write in" memory circuit to the "read out" memory circuit is carried out sequentially in a series manner. Only the signals from the two memory devices of the "read out" memory circuit are transmitted in parallel, so that the wiring therebetween becomes much simple.

In the illustrated embodiment of the invention, the video signal is coded to be 6 bits, and then each of the "write in" memory circuits stores a 6 bit signal and each of the "read out" memory circuits is stores 2 bits. However, the present invention need not be restricted to this encoding scheme. That is, the present invention can be applied to the case where the video signal is sampled and coded with $m \times n$ bits ($m$ and $n$ being both positive integers); each of the "write in" memory circuits stores $m \times n$ bits; each of the "read out" memory circuits stores $m$ bits; the contents of the "write in" memory circuits are transferred to the "read out" memory circuits $m$ bits at a time and sequentially from lower or least significant bits to higher or most significant bits with different transfer intervals corresponding to the weight of the coded or most significant; and then read out.

Having described an illustrative embodiment of the invention, it will be apparent that many modifications and variations could be effected therein by one skilled in the art without departing from the spirit and scope of the novel concepts of the invention. Therefore, it is intended that the appended claims be construed to cover all such modifications and variations.

We claim as our invention:

1. A video display system comprising:
   A. a display panel including a group of first parallel electrodes and a group of second parallel electrodes substantially perpendicular to said first electrodes;
   B. a group of first driving circuits connected to said first parallel electrodes respectively;
   C. a group of second driving circuits connected to said second electrodes respectively;
   D. a video signal source for supplying a video signal;
   E. a synchronizing signal separator connected to said video signal source for separating horizontal and vertical synchronizing signals from said video signal;
   F. means supplied with said horizontal synchronizing signals for driving said first driving circuits sequentially in synchronism with said horizontal synchronizing signals;
   G. means connected to said video signal source for sampling the level of the video signal and producing a digitally coded output signal for each video signal sample;
   H. a group of first memory circuits connected to said second driving circuits respectively, each of the first memory circuits including a plurality of memory devices serially connected to form a shift register, an input terminal for supplying a digitally coded signal sequentially to said shift register, and a plurality of output terminals coupled to respective ones of the memory devices, said plurality of output terminals being connected to a corresponding one of said second driving circuits through resistors respectively;
   I. a group of second memory circuits connected to the input terminals of said first memory circuits respectively, each of said second memory circuits being supplied with one of said digitally coded output signals such that said group of second memory circuits stores a representation of the video signal supplied during a predetermined interval; and
   sequentially each digitally coded output signal stored in said second memory circuit to associated ones of said first memory circuits.

2. A video display system according to claim 1, wherein said digitally coded output signal of said sampling means is an $m \times n$ $n$-bit signal where m and n are positive integers respectively; each of said first memory circuits consists of $m$-bit memory devices; each of said second memory circuits consists of $m \times n$-bit memory devices; and said control means transfers $m$ bits at a time from said second memory circuits to said associated first memory circuits sequentially from lower order bits to high order bits during different transfer intervals corresponding to the relative order of the transferred bits, and means for operating said control means just after all the second memory circuits store the digitally coded output signals and for supplying said digitally coded output signals to said second memory circuits just after the last $m$ bits of the signals stored in said second memory circuits are transferred to the first memory circuits respectively.

3. A video display system according to claim 2, wherein each of said second memory circuits is a shift register, each shift register being comprised of $m \times n$ stages to store $m \times n$ bits, respectively, of said digitally coded output signal and to serially supply the $m \times n$ bits stored therein to an associated one of said first memory circuits; a first of said shift registers having its $m \times n$ stages connected to receive said $m \times n$ bits of said digitally coded output signal in parallel from said sampling means and to shift said $m \times n$ bits in parallel sequentially to the succeeding shift registers and said control means serially transfers said $m \times n$ bits stored in all of said shift registers through said respective $m \times n$ stages to said first memory circuits.

4. A video display system comprising:
   A. a display panel including a group of first parallel electrodes and a group of second parallel electrodes substantially perpendicular to said first electrodes;
   B. a group of first driving circuits connected to said first parallel electrodes respectively;
   C. a group of second driving circuits connected to said second electrodes respectively;
   D. a video signal source for supplying a video signal;
   E. a synchronizing signal separator connected to said video signal source for separating horizontal and vertical synchronizing signals from said video signal;
   F. means supplied with said horizontal synchronizing signals for driving said first driving circuits sequentially in synchronism with said horizontal synchronizing signals;
   G. means connected to said video signal source for sampling the level of the video signal and producing and $m \times n$-bit digitally coded output signal for each sample, where m and n are positive integers respectively;
   H. a group of first memory circuits connected to said second driving circuits respectively, each of the first memory circuits consisting of $m$-bit memory devices for supplying the signals stored therein to a respective one of said second driving circuits;
   I. a group of second memory circuits connected to said first memory circuits respectively, each of the second memory circuits consisting of $m \times n$ bit memory devices having an output coupled to a respective one of said m-bit memory devices for serially supplying thereto the signals stored in said $m \times n$ bit memory device;
   J. first control means cpoupled to said second memory circuits for transmitting each digitally coded output from sampling means sequentially to said group of second memory circuits; and
   K. second control means coupled to said first and second memory circuits for transmitting signals stored in the second memory circuits to the first memory circuits, respectively, said signals being transmitted $m$ bits at a time and sequentially from lower order bits to higher order bits with different transmission intervals for the respective bits corresponding to the relative bit-order thereof.
   said second control means being operative just after all the digitally coded output signals are stored in said second memory circuits and said first control means being operative just after the last m bits of the signals stored in said second memory circuits are transmitted to the first memory circuits respectively.

5. In a video display system of the type having a selectively energizable viewable matrix defined by intersecting rows and columns of elements driven by respective row and column driver circuits in response to a video signal, apparatus for controlling said driver circuits to display a viewable image corresponding to said video signal, comprising:

means for sampling said video signal and producing a multi-bit digital representation of each sample;

first storage means comprised of plural first storage circuits for storing the digital representations of said video signal produced during a predetermined time interval, each said storage circuit including storage devices to store all of the bits of a digitally represented sample;

second storage means comprised of plural second storage circuits, each of said second storage circuits including a number of storage devices less than the number of storage devices included in each said first storage circuits, respective ones of said second storage circuits being coupled to respective ones of said first storage circuits for serially receiving all of the bits of said digitally represented samples stored in said first storage circuits; said second storage means being coupled to said column driver circuits for actuating same as a function of the digitally represented samples received by said second storge means;

timing means synchronized with said video signal and coupled to said first and second storage means for serially transferring said digitally represented samples from said first storage means to said second storage means at preselected periods; and means coupled to aid row driver circuits for sequentially actuating same during successive ones of said predetermined time interval.

6. The apparatus of claim 5 wherein each of said first storage circuits is comprised of a multi-stage shift register, a first of said multi-stage shift registers being coupled to said sampling means to sequentially receive each multi-bit digital representation in parallel; the remaining multi-stage shift registers being connected to sequentially receive successive multi-bit digital representations in parallel; and wherein each multi-stage shift register is coupled to said timing means to serially shift the multi-bit digital representation stored therein through successive ones of said stages.

7. The apparatus of claim 6 wherein each of sad second storage circuits is comprised of shift register having a number of stages less than the number of stages included in each multi-stage shift register, said shift register serially receiving said multi-bit digital representation transferred thereto from an associated multi-stage shift register; and wherein the output of each stage in said shift register is coupled to a respective column driver circuit.

8. The apparatus of claim 7 wherein each multi-bit digital representation is stored in a respective multi-stage shift register in a predetermined bit order; and wherein said timing means includes means for transferring said multi-bit digital representations to said shift registers for periods having greater durations as the relative significance of the transferred bit in said predetermined bit order increases.

* * * * *